S. W. WARDWELL.
STOPPING DEVICE FOR WINDING SPINDLES.
APPLICATION FILED OCT. 3, 1910.

1,097,691.

Patented May 26, 1914.

WITNESSES
Carl V. J. Christensen
Charles D. Reynolds

INVENTOR
Simon W. Wardwell
By Edwin C. Smith
ATTORNEY

UNITED STATES PATENT OFFICE.

SIMON W. WARDWELL, OF PROVIDENCE, RHODE ISLAND.

STOPPING DEVICE FOR WINDING-SPINDLES.

1,097,691.  Specification of Letters Patent.  Patented May 26, 1914.

Application filed October 3, 1910. Serial No. 585,057.

*To all whom it may concern:*

Be it known that I, SIMON W. WARDWELL, a citizen of the United States, residing at Providence, in the county of Providence and State of Rhode Island, have invented a new and useful Stopping Device for Winding-Spindles, of which the following is a specification.

My invention is an improved stopping device for winding spindles especially needful where two or more threads are wound from two or more bobbins at the same time, so when one bobbin thread is consumed in the winding process, the spindle will be stopped the instant that this bobbin thread is released by the tension mechanism, and before the end is carried onto the package being wound so that the succeeding thread may be attached without disturbing the package.

Figure 1:
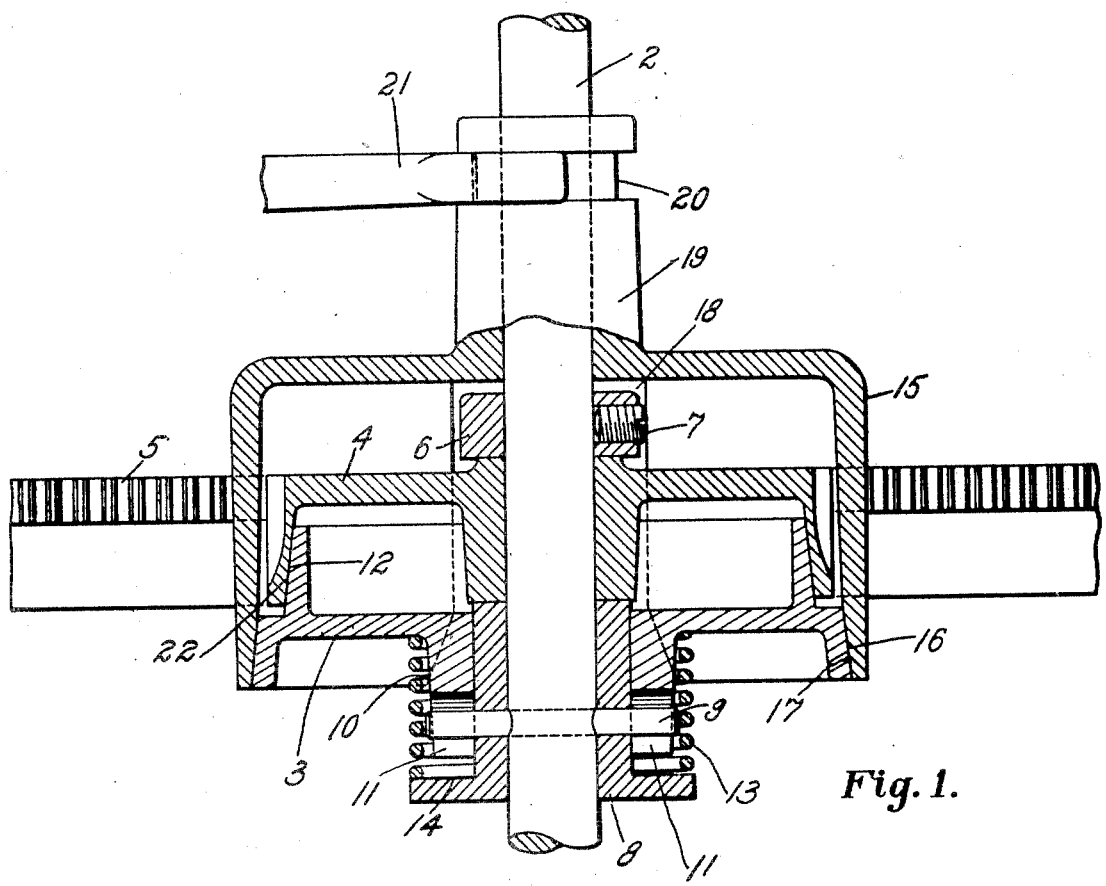
Figure 2:
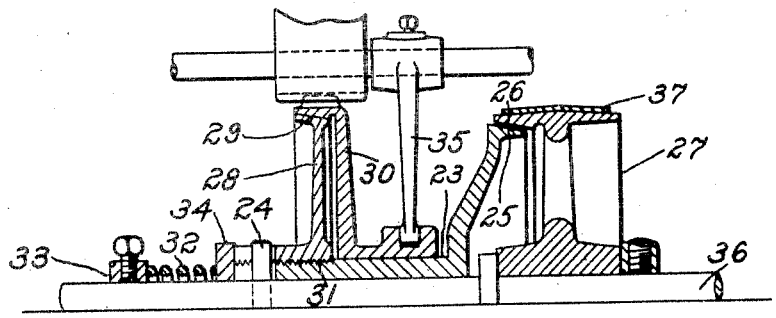

Of the following accompanying drawings forming a part of my specification, Figure 1 shows an elevation in part section of my preferred construction. Fig. 2 shows a modification.

Referring to Fig. 1, the spindle is driven through a clutch 3 by suitable driving means, as by the wheels 4 and 5 which are preferably gears as shown. The gear 4 turns freely on the spindle 2 between the collar 6 secured to the shaft by any suitable means, as the set screw 7, and the shouldered collar 9 which is preferably secured by the pin 9, the latter passing through the shaft and projecting on either side of the collar. The clutch 3 fits the shouldered collar 8 by its hub 10, the latter having slots or recesses 11—11 by which it straddles the pin 9, engaging the latter to drive the shaft 2. The clutch 3 is of the friction type, having an external cone surface 12, which engages the internal cone or taper surface 22 of the gear 4, the degree of taper of the cone being that usual for friction clutches. The clutch 3 is normally maintained in engagement with the gear 4, by the spring 13 which is under compression between said clutch 3, and the shoulder 14 of the collar 8. Above the gear 4 and the clutch 3 is a brake 15, also slidable on the spindle 2, but non-rotative thereon, and also having an internal clutch taper 16, which is adapted to engage the corresponding external taper 17 of the clutch 3. An opening 18, in the shell of the brake admits the gear 5 to mesh with the gear 4. The hub 19 of the brake has a groove 20, with which engages the yoke 21 whereby the brake 15 is shifted.

The action of my device is as follows: While the spindle 2 is in operation, the brake 15 is upheld by the yoke 21, above and out of engagement with the clutch 3, so that the latter is free to respond to the spring 13, and to rotate without interference by the brake. The spring 13 forces the clutch 3 into engagement with the gear 4, thereby operatively connecting the spindle 2 with the driving gear 5. When the operation of the spindle 2 is to be stopped, the yoke 21 is lowered forcing down the brake 15. In so doing, it encounters by its internal taper 16, the external taper 17 of the clutch and forces it from engagement with the gear 4. Obviously such engagement also arrests rotation of the clutch and connected spindle 2.

Fig. 2 shows a modification of my invention as adapted for a belt drive, in which case, the spindle is driven from a belt 37. The clutch is here made in two pieces, one 23 mounted directly on the spindle 36, and connected therewith by the pin 24. An external clutch taper 25 is opposed to an internal clutch taper 26 of the pulley 27, on which the belt rides. Mounted on the hub of the clutch is a brake disk 28 having a clutch taper 29 with which can be engaged the opposed internal clutch face of the non-rotatable brake 30. The brake disk may be secured to the hub of the clutch in any suitable manner, as by the screw threads 31 which prevent longitudinal derangement. The hubs of the clutch and brake disk are both slotted to receive the pin 24, which prevents the brake disk turning on the clutch, as well as acting as a rotative connection with the spindle 36. A spring 32, acting between the collar 33 and the hubs of the clutch tends to maintain the pulley and clutch in working engagement. Preferably a washer 34 is interposed between the spring and hub. The brake 30 is operated by the yoke 35 to engage and concurrently stop the rotation of the clutch, or to release the clutch to the action of the spring 32 and of the pulley 27.

Obviously further modifications and adaptations may be constructed which do not depart from the spirit of my invention.

The advantage of my novel construction is that it eliminates the interval of time between the cessation of driving action upon the spindle and application of the brake. A further advantage is the elimination of adjustments to compensate for wear at the braking and clutching surfaces. Wear does not tend to derange the relation of these, and the avoidance of adjustments insures that the device shall not "get out of order." Both of these characteristics are peculiarly valuable in winding at high speeds, especially where a plurality of yarns are wound together as one. In such multiple winding adequate results demand absolute continuity of each yarn, and uniformity of tension on each individual yarn. It is inadmissible for an end to run into the package, and the winding must be stopped before this can occur. When an end does run into the package being wound, it is necessary to unwind until that end is found. In such case, all the ends must be broken and retied, and it is obviously impossible to retie them so as to maintain the tension uniform in all the ends. Sometimes, through carelessness or otherwise, all the ends are tied together in a bunch knot, which is wrong, causing damage or defect in subsequent processes. Another evil is due to tying each end separately, but all at one point so the knots bunch together. These evils are entirely prevented by my device which as stated stops the spindle the instant the driving action ceases, and automatically maintains that concurrence of braking action with discontinuance of driving action.

Without limiting myself to the precise construction and arrangement of the device, I claim:

1. In a stopping device, the combination with a spindle, a wheel rotatably free of the spindle and means to drive the wheel, of a clutch member rotatively fixed to the spindle and having longitudinal movement thereon, and formed to receive a brake, means to engage the clutch with the wheel to drive the spindle from the wheel, a brake movable to and from the clutch but normally away from it, and means to engage the brake with the clutch with braking effect, which braking engagement also and concurrently disengages the clutch from the wheel.

2. In a stopping device, the combination with a spindle and wheel rotating concentric therewith, of a clutch rotatively connected with the spindle and normally rotated by the wheel, a brake which, by engaging the clutch with braking effect to stop the rotation of the spindle, concurrently, and by said braking engagement, withdraws the clutch from operative engagement with the wheel, and means to move the brake into braking engagement with the clutch.

3. In a stopping device, the combination with a spindle and means to drive the same, of a clutch movable longitudinally of the spindle to operatively connect the spindle and spindle driving means and rotatable with the spindle, a brake movable with respect to the clutch and in the same direction to engage and shift the clutch to disconnect the spindle from the spindle driving means, said engagement acting at the same time to arrest the rotation of the clutch and spindle, and means to move the brake.

4. In a stopping device, the combination with the spindle 2, the gear 4 freely rotatable thereon, and having a clutch formation, a clutch member 3 fitted to the clutch formation of the gear 4 and having a brake face 17, a spring 13 to normally force the clutch into engagement with the gear, a brake 15 having a brake face 16 corresponding with the brake face 17 of the clutch, and means to engage the brake face 16 of the brake with the brake face 17 of the clutch 3, to disengage the latter from the gear 4 and stop the spindle.

5. In a stopping device, the combination with a spindle 2, a shouldered collar 8 and a pin 9 to secure the collar to the spindle and projecting beyond the surface of the collar, of a clutch 3 mounted on and rotatively locked to the collar and spindle by a projecting portion of the pin 9, a gear 4 freely rotatable on the spindle 2 but immovable longitudinally thereon, and a non-rotatable brake movable to engage the clutch which engagement acts coincidently to restrain the clutch and its connected spindle from rotation and to withdraw the clutch 3 from the gear 4.

6. In a stopping device, the combination with the spindle, driving means therefor and a clutch to operatively connect the spindle and driving means, of a brake which engages the clutch and in such engagement, acts coincidentally to arrest the clutch and spindle and to withdraw the clutch from operative connection with the driving means, means to normally maintain the clutch in operative connection with the driving means, and means to disconnect the clutch from operative connection through the instrumentality of the brake as described.

7. In a stopping device, the combination with a wheel which is rotatable but restrained axially, and means to restrain it from axial movement, of a friction clutch normally engaging the wheel and formed to receive a brake, a brake opposed to the clutch and normally away from it, and means to apply the brake to the clutch to stop its rotation, the said application taking effect instantly the clutch is disengaged from the wheel.

8. In a stopping device, the combination with a wheel having a conical clutching surface and means to restrain the wheel from axial movement, of a friction clutch having a conical clutching surface to engage the wheel and a conical brake surface, a brake having a conical brake surface to engage the clutch and means to move the brake to engage the brake surface of said clutch and continue said movement to disengage the clutch from the wheel.

9. In a stopping device the combination with a clutch and means to drive it, said clutch having a brake surface, of a brake opposed to the clutch and means to apply the brake which application disengages the clutch from its driving means and is instantly effective to stop the clutch upon such disengagement.

10. In a stopping device the combination with a clutch and means to drive it, said clutch having a brake face, of a brake concentric with the clutch, adapted to and opposed to the brake face, and means to apply the brake, which application disengages the clutch from its driving means and upon such disengagement is instantly effective to stop the clutch.

11. In a stopping device, the combination with a spindle and wheel rotating concentric therewith, of a clutch rotatively connected with the spindle and normally rotated by the wheel, a brake which, by engaging the clutch with braking effect to stop the rotation of the spindle, withdraws the clutch from operative engagement with the wheel, acting instantly upon such withdrawal, and means to move the brake into braking engagement with the clutch.

12. In a stopping device, the combination with a driving means, a clutch normally engaging the driving means but movable axially to be disengaged therefrom, a brake concentric with the clutch and also capable of axial movement, and means to apply the brake to the clutch to stop the latter, the said application of the brake also separating the clutch from the driving means, and taking effect instantly upon disengagement of the clutch from the driving means.

13. In a stopping device, the combination with a spindle and a driving wheel, a clutch movable longitudinally of the spindle to be disengaged therefrom, and a brake movable longitudinally of the spindle to engage the clutch, of means to move the brake to apply it to the clutch and disengage the clutch from the driving wheel, the action of applying the brake, preceding the disengagement of the clutch, as described.

14. In a stopping device, the combination with a spindle and a driving wheel, a clutch movable longitudinally of the spindle to be engaged with or disengaged from the driving wheel and a brake similarly movable to engage the clutch or to release it, of means to move the brake in either direction, movement in one direction causing first an encounter of brake with clutch and then disengagement of the clutch from the driving wheel; and movement in the reverse direction causing first reëngagement of the clutch with the driving wheel and then separation of the brake from the clutch, as described.

In testimony whereof I affix my signature in presence of two witnesses.

SIMON W. WARDWELL.

Witnesses:
    FERDINAND MARTIN,
    HAMILTON RICE.